United States Patent [19]
Phelon et al.

[11] Patent Number: 6,070,330
[45] Date of Patent: *Jun. 6, 2000

[54] HACKSAW HAVING CAM-ACTUATED BLADE TENSIONING MECHANISM

[75] Inventors: Russell D. Phelon, San Juan, Puerto Rico; John D. Jollie, Aiken, S.C.; Robert F. Miller, Martinez, Ga.

[73] Assignee: R.E. Phelon Company, Inc., Aiken, S.C.

[*] Notice: This patent is subject to a terminal disclaimer.

[21] Appl. No.: 09/177,768

[22] Filed: Oct. 23, 1998

Related U.S. Application Data

[63] Continuation of application No. 08/748,338, Nov. 13, 1996, Pat. No. 5,826,344.

[51] Int. Cl.$^7$ .................................................. B27B 21/02
[52] U.S. Cl. ................................. 30/513; 30/506; 30/507
[58] Field of Search ............................. 30/506, 507, 513

[56] References Cited

U.S. PATENT DOCUMENTS

| | | | |
|---|---|---|---|
| 1,446,674 | 2/1923 | Thompson | 30/513 |
| 1,517,827 | 12/1924 | De Grado | 30/513 |
| 3,636,997 | 1/1972 | Keymer | 30/513 |
| 5,826,344 | 10/1998 | Phelon et al. | 30/513 |

*Primary Examiner*—Hwei-Siu Payer
*Attorney, Agent, or Firm*—Nelson Mullins Riley & Scarborough

[57] ABSTRACT

A hacksaw of the type utilizing an elongated blade maintained tension between respective legs of the saw frame includes a cam-actuated blade tensioning mechanism. One leg of the saw frame includes a fixed blade pin for receipt through a mounting hole defined at one end of the elongated blade. The other leg of the saw frame includes a pin carrier having a blade pin for receipt through the mounting hole defined at the other end of the elongated blade. The pin carrier is pivotal between a blade release position and a blade securement position. In presently preferred embodiments, the pin carrier defines a cam follower engaging an elliptically arcuate cam surface defined on a pivotal actuator member. The actuator member may have a lever portion for providing mechanical advantage during its pivotal movement. A releasable lock mechanism is provided to maintain the actuator member, and thus the pin carrier, in the blade securement position during use. Preferably, the releasable lock mechanism is configured to require the simultaneous occurrence of two events in order to permit release of the blade.

9 Claims, 6 Drawing Sheets

HACKSAW HAVING CAM-ACTUATED BLADE TENSIONING MECHANISM

This is a continuation of application Ser. No. 08/748,338 filed Nov. 13, 1996, now U.S. Pat. No. 5,826,344.

BACKGROUND OF THE INVENTION

The present invention relates generally to hacksaws utilizing an elongated blade maintained in tension between respective legs of the saw frame. More particularly, the invention relates to such a hacksaw that incorporates an improved blade tensioning mechanism.

A conventional hacksaw blade defines respective mounting holes at each end for receipt on blade pins carried by the hacksaw. One of these pins will be often be fixed with respect to the saw frame. The other pin will be movable in some manner to facilitate installation of the blade.

For example, in one commonly-used arrangement, the movable blade pin may be mounted to a threaded member extending through a hole defined in the saw frame. A wing nut or the like engages the threaded member to effect movement of the movable blade pin toward or away from the fixed blade pin. In this manner, the distance between the respective blade pins may be shortened to facilitate installation of the blade. After the blade has been installed, the wing nut is tightened to lengthen the distance between the blade pins and place the blade in tension.

It will be appreciated that changing blades with such a mechanism can be a relatively time consuming procedure. In addition, it is often difficult to maintain a relatively constant tension in each new blade. As such, the prior art has provided more complex mechanisms that are intended to expedite blade change, provide better tension control, or both. Examples of such mechanisms are shown in U.S. Pat. No. 4,571,829 to Withers, Jr. and U.S. Pat. No. 4,466,471 to Thomson.

SUMMARY OF THE INVENTION

The present invention recognizes and addresses various disadvantages of prior art constructions and methods. Accordingly, it is an object of the present invention to provide a novel hacksaw arrangement.

It is a more particular object of the present invention to provide a hacksaw utilizing a blade tensioning and release mechanism that expedites blade change.

It is a more particular object of the present invention to provide a hacksaw utilizing a blade tensioning and release mechanism that provides a generally constant tension in the hacksaw blade.

It is another object of the present invention to provide a hacksaw utilizing a novel mechanism for blade tensioning and release.

Some of these objects are achieved by a hacksaw for use with an elongated blade defining respective first and second mounting holes at opposite ends thereof. The hacksaw comprises a frame having a first leg and a second leg spaced apart for maintaining the elongated blade therebetween. At least one first blade pin is located on the first leg for receipt of the first mounting hole thereon.

The hacksaw further comprises a pin carrier connected to the second leg that includes at least one second blade pin for receipt of the second mounting hole thereon. The pin carrier is pivotal such that the second blade pin is movable between a blade release position and a blade securement position. An actuator member is also pivotally connected to the second leg and engages the pin carrier to operatively move the second blade pin between the blade release position and the blade securement position.

In presently preferred embodiments, one of the pin carrier and the actuator member defines a cam surface. Another of the pin carrier and the actuator member defines a cam follower engaging the cam surface. For example, the pin carrier may define the cam follower and the actuator member may define the cam surface. The cam surface may be defined as an elliptically arcuate surface.

In some exemplary embodiments, the pin carrier comprises a generally V-shaped member pivotal about a pivot point adjacent an apex thereof. The second blade pin and the cam follower are each located radially outward of the pivot point and separated from each other by a predetermined angular separation. In such embodiments, the actuator member may comprise an actuator portion defining the cam surface as an elliptically arcuate surface thereon. A lever portion may integrally extend from the actuator portion in such embodiments.

The hacksaw may further include a releasable lock mechanism operative to maintain the second blade pin in the blade securement position. The releasable lock mechanism may include first and second engaging elements that are selectively interconnectable. A release actuator mounted to the frame and pivotal between a release position and an engaging position may also be provided. In this case, the first and second engaging elements may respectively comprise a first engaging finger extending from the lever portion of the actuator member and a second engaging finger extending from the release actuator. Spring means may also be provided to urge the release actuator into the engaging position.

Other objects of the invention are achieved by a hacksaw for use with an elongated blade. The hacksaw comprises a frame having a first leg and a second leg spaced apart for maintaining the elongated blade therebetween. First connecting means are associated with the first leg of the frame for connecting a first end of the elongated blade.

The hacksaw further includes a carrier connected to the second leg, the carrier including a second connecting means for connecting a second end of the elongated blade member. The carrier is pivotal such that the second connecting means is movable between a blade release position and a blade securement position.

An actuator member is pivotally connected to the second leg and engages the carrier to operatively move the second connecting means between the blade release position and the blade securement position. One of the carrier and the actuator member defines a cam surface and another of the carrier and the actuator member defines a cam follower engaging the cam surface. For example, the carrier may define the cam follower and the actuator member may define the cam surface.

In some exemplary embodiments, the carrier may comprise a generally V-shaped member pivotal about a pivot point adjacent an apex thereof. The second connecting means and the cam follower are each located radially outward of the pivot point and separated from each other by a predetermined angular separation.

The actuator member may comprise an actuator portion defining the cam surface as an elliptically arcuate surface thereon. The actuator member may further comprise a lever portion integrally extending from the actuator portion. In some exemplary embodiments, the frame may define a cavity for at least partially receiving the carrier and the actuator member.

In presently preferred embodiments, the hacksaw further comprises a releasable lock mechanism including first and second engaging elements selectively interconnectable to maintain the second connecting means in the blade securement position. A release actuator may be mounted to the frame, pivotal between a release position and an engaging position. In such embodiments, the first and second engaging elements may respectively comprise a first engaging finger extending from the actuator member and a second engaging finger extending from the release actuator. spring means may be associated with the release actuator for urging the release actuator into the engaging position.

Other objects of the invention are achieved by a tensioning mechanism for use in a saw device utilizing a blade operatively maintained in tension. The tensioning mechanism comprises a supporting frame having a carrier connected thereto. The carrier includes connecting means for connecting the blade and is pivotal such that the connecting means is movable between a blade release position and a blade securement position.

An actuator member is also pivotally connected to the supporting frame. The actuator member engages the carrier to operatively move the connecting means between the blade release position and the blade securement position. One of the carrier and the actuator member defines a cam surface and another of the carrier and the actuator member defines a cam follower engaging the cam surface.

In some presently preferred embodiments, the carrier defines the cam follower and the actuator member defines the cam surface. In such embodiments, the carrier may be constructed as a generally V-shaped member pivotal about a pivot point adjacent an apex thereof. The connecting means and the cam follower may each be located radially outward of the pivot point and separated from each other by a predetermined angular separation.

The actuator member may comprise an actuator portion defining the cam surface as an elliptically arcuate surface thereon. The actuator member may further comprise a lever portion integrally extending from the actuator portion.

The tensioning mechanism may further comprise a releasable lock mechanism including first and second engaging elements selectively interconnectable to maintain the connecting means in the blade securement position. A release actuator may be mounted to the supporting frame and pivotal between a release position and an engaging position. In this case, the first and second engaging elements may respectively comprise a first engaging finger extending from the lever portion of the actuator member and a second engaging finger extending from the release actuator. Spring means may be associated with the release actuator for urging it into the engaging position.

Other objects, features and aspects of the invention are discussed in greater detail below.

BRIEF DESCRIPTION OF THE DRAWINGS

A full and enabling disclosure of the present invention, including the best mode thereof, to one of ordinary skill in the art, is set forth more particularly in the remainder of the specification, including reference to the accompanying drawings, in which.

Figure 1:
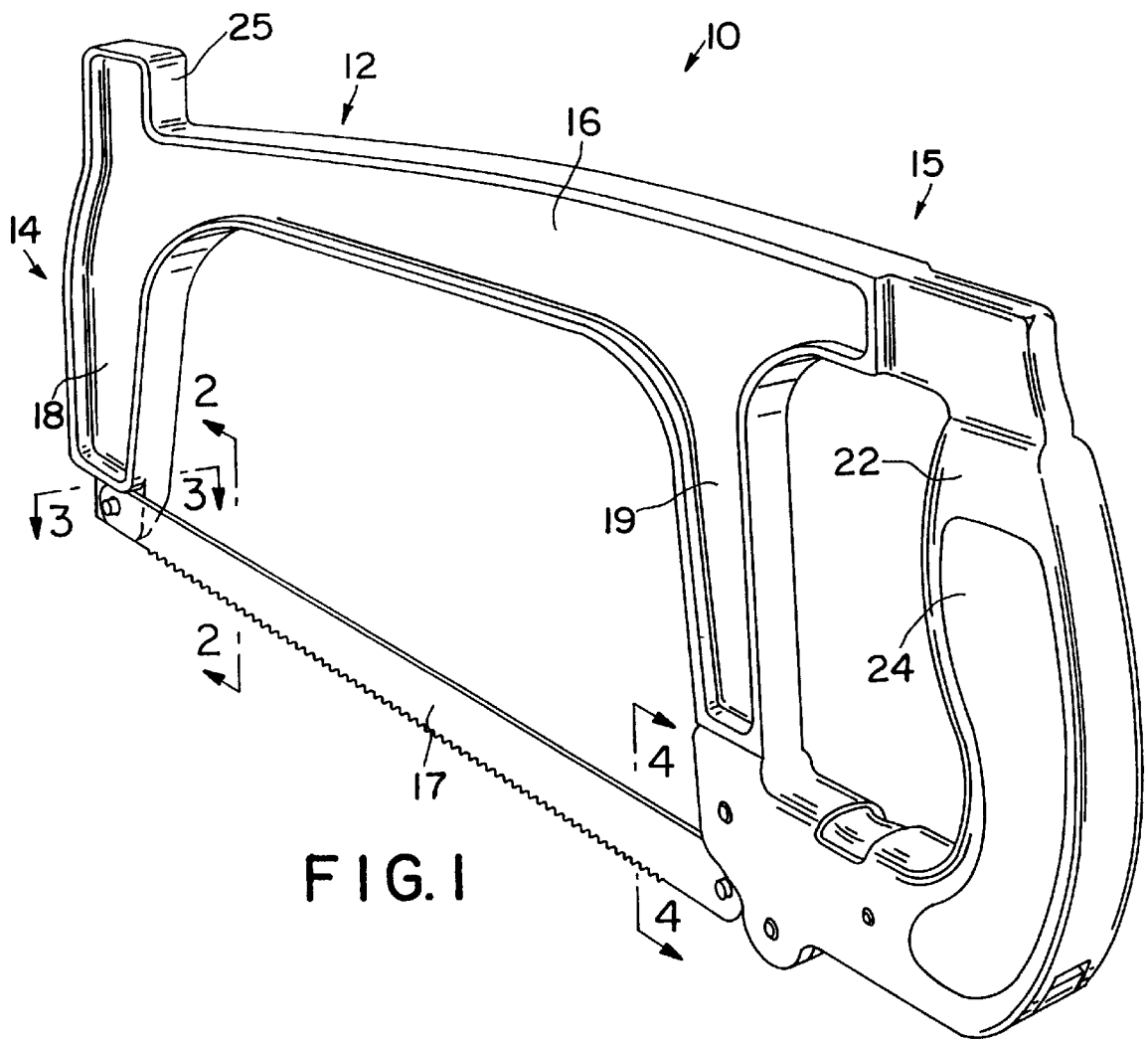
FIG. 1 is a perspective view of a hacksaw constructed in accordance with the present invention.

Repeat use of reference characters in the present specification and drawings is intended to represent same or analogous features or elements of the invention.

DETAILED DESCRIPTION OF PREFERRED EMBODIMENTS

It is to be understood by one of ordinary skill in the art that the present discussion is a description of exemplary embodiments only, and is not intended as limiting the broader aspects of the present invention, which broader aspects are embodied in the exemplary constructions.

FIG. 1 illustrates a hacksaw 10 constructed in accordance with the present invention. Hacksaw 10 includes a frame 12 having a first leg portion 14 and a second leg portion 15 interconnected by horizontal member 16. A typical hacksaw blade 17 having a serrated bottom edge extends across the open area defined between leg portions 14 and 15.

As can be seen, first leg portion 14 in this case is constructed as a vertical member 18. Second leg portion 15 also includes a vertical member 19. In addition, a handle 22 is spaced apart from vertical member 19 sufficient to provide an opening through which a user's fingers can extend.

Preferably, handle 22 has an ergonomic configuration to enhance user comfort. In addition, a textured surface may be provided on handle 22 to facilitate positive gripping. In this case, the textured surface is provided by inserts, such as insert 24, located on opposite sides of handle 22. These inserts are preferably constructed of an appropriate elastomeric material, such as rubber or the like. A "push" 25 extends up from vertical member 18 to facilitate additional pushing with the user's other hand.

As can be seen, frame 12 is constructed as a generally unitary body. This is in contrast to many prior art designs in which the frame was constructed from multiple components. For example, a common construction of the prior art utilized three (3) components: a handle, a steel bar and a front bracket. The use of three such components requires more assembly, and results in larger tolerance stackups than a one-piece design.

In presently preferred embodiments, vertical members 18 and 19, as well as horizontal member 16, have an "I-beam" cross section to provide favorable rigidity and strength characteristics. Preferably, frame 12 is constructed of an appropriate cast metal, such as aluminum.

Figure 2:
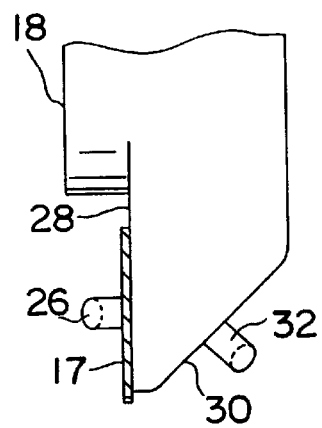
FIG. 2 is a fragmentary view taken along line 2—2 of FIG. 1.

Blade 17 defines holes at opposite ends thereof for receipt of blade pins carried by hacksaw 10. This is shown in FIG. 2, where one end of blade 17 is shown received on blade pin 26. Blade pin 26 extends from a vertical face 28 defined at the bottom portion of vertical member 18.

Figure 2A:
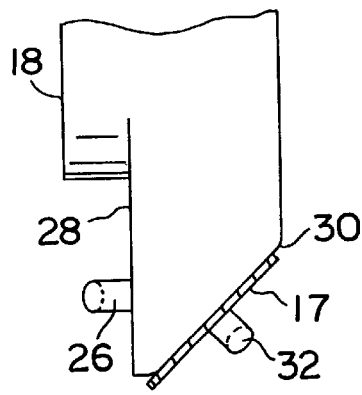
FIG. 2A is a view similar to FIG. 2 showing an alternative angled blade position.
Figure 3:
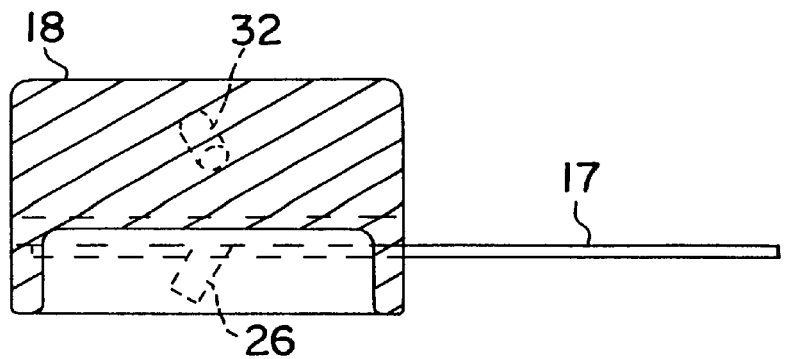
FIG. 3 is a partial cross sectional view taken along line 3—3 of FIG. 1.

Vertical member 18 also defines an angled face 30 having a blade pin 32 extending therefrom. As shown in FIG. 2A, angled face 30 permits blade 17 to be attached in an alternative angular configuration. In the illustrated embodiment, this angular orientation is approximately 45° offset from the vertical orientation shown in FIG. 2. As illustrated in FIG. 3, the various blade pins of hacksaw 10 may slant away from the center portion of blade 17 to provide a "hooking" effect.

Figure 4:
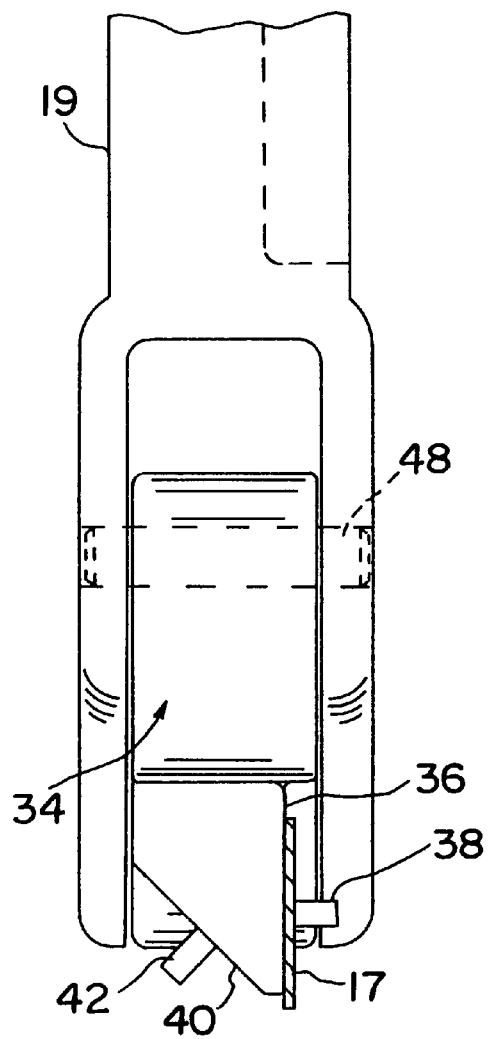
FIG. 4 is a fragmentary view taken along line 4—4 of FIG. 1.

Connection of the opposite end of blade 17 is illustrated in FIG. 4. In this case, blade 17 is connected utilizing a pin carrier 34 located adjacent the bottom portion of second leg portion 15. Pin carrier 34 defines a vertical face 36 having a blade pin 38 mounted thereon. The hole defined at this end of blade 17 may be received over blade pin 38, as illustrated. Pin carrier 34 further includes an angled face 40 having a blade pin 42, if it is desired to mount blade 17 in the alternative angled orientation discussed above.

Figure 5:
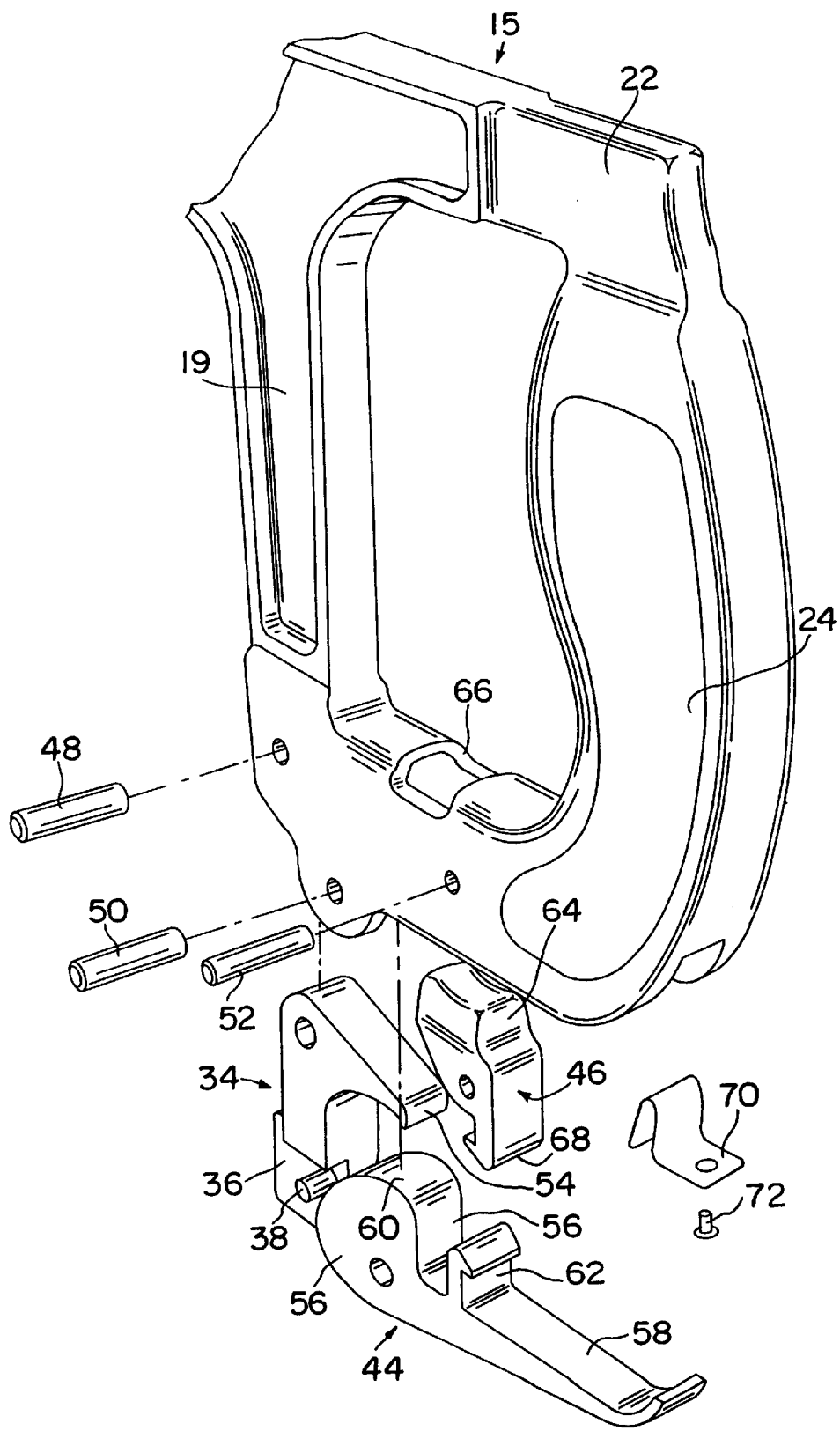
FIG. 5 is an assembly view of the tensioning mechanism utilized in the hacksaw of FIG. 1.

Referring now to FIG. 5, pin carrier 34 is an element of a tensioning and release mechanism for permitting the hacksaw blade to be easily changed. Other elements of the mechanism include an actuator member 44 and a release button 46. Each of pin carrier 34, actuator member 44 and release button 46 are pivotally connected to frame 12, such as utilizing respective dowels 48, 50 and 52. As can be seen, much of the tensioning mechanism will be conveniently located inside a cavity defined in leg portion 15 for this purpose.

Pin carrier 34 is constructed as a generally V-shaped member pivotal about a pivot point located near its apex. Blade pin 38 is located radially outward from this pivot point, as shown. A cam follower 54 is also located radially outward from the pivot point, but angularly separated from blade pin 38.

Actuator member 44 is constructed having an actuator portion 56 integrally extending into a lever portion 58. Actuator portion 56 defines an elliptically arcuate cam surface 60 that is engaged by cam follower 54. Lever portion 58 provides mechanical advantage as actuator member 44 is pivoted about its pivot point. An engaging finger 62 extends upwardly from the top surface of lever portion 58, as shown.

Release button 46 includes an upper button portion 64 received through a hole 66 defined in frame 12. Release button 46 further includes an engaging finger 68 for releasably interconnecting with engaging finger 62, as will be explained more fully below.

Figure 6A:
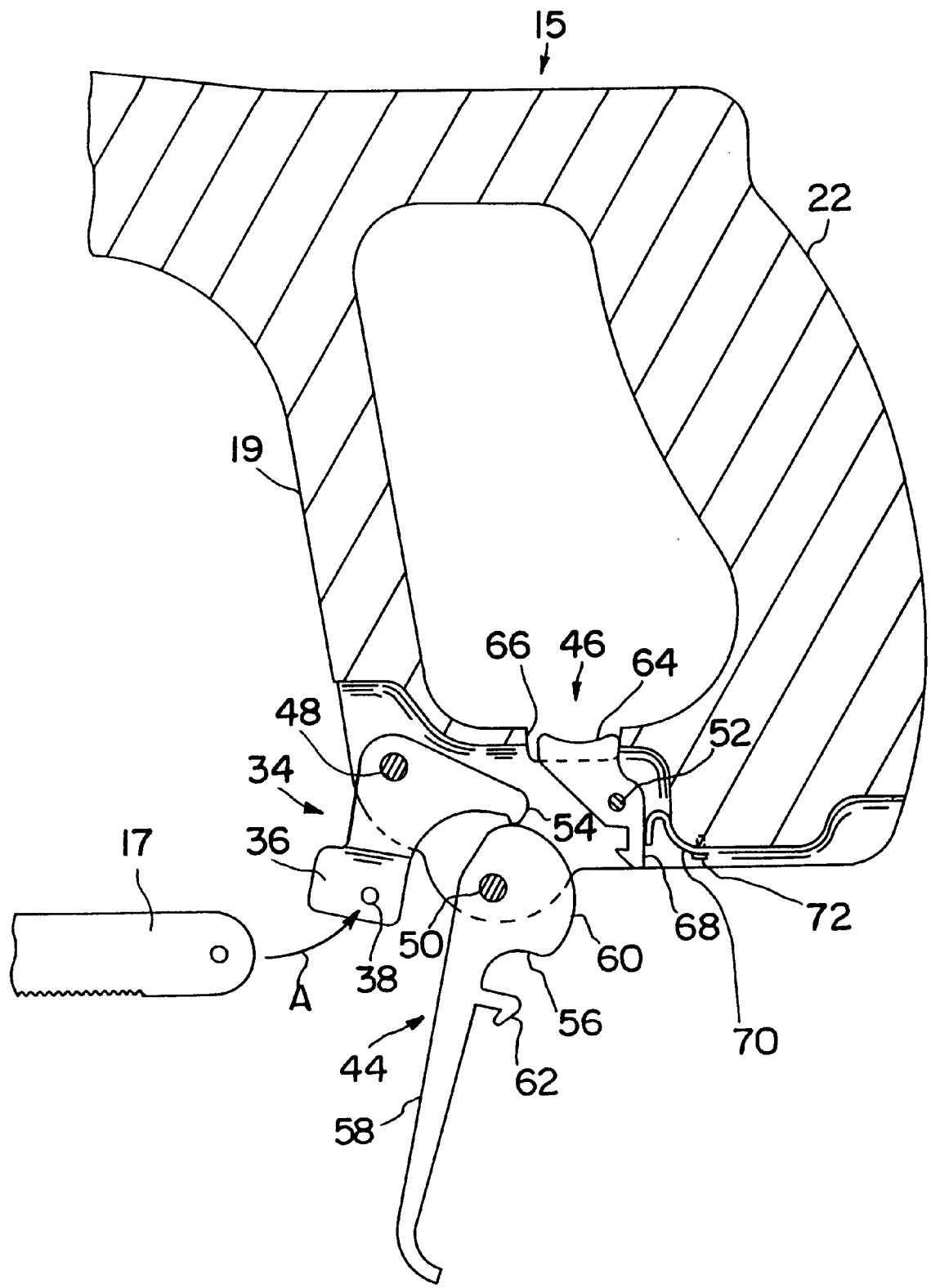
FIGS. 6A—6C are partial cross-sectional views illustrating operation of the tensioning mechanism utilized in the hacksaw of FIG. 1.

The operation of the tensioning mechanism will now be described with reference to FIGS. 6A–6C. Referring first to FIG. 6A, lever portion 58 is pivoted fully away from handle 22. As can be seen, cam follower 54 is now located on a portion of cam surface 60 in which the diameter from cam surface 60 to dowel 50 is relatively small. As a result, pin carrier 34 may be pivoted forward such that blade pin 38 will be located in a blade release position. In this blade release position, blade 17 may be easily attached to blade pin 38, such as shown by arrow A.

Figure 6B:
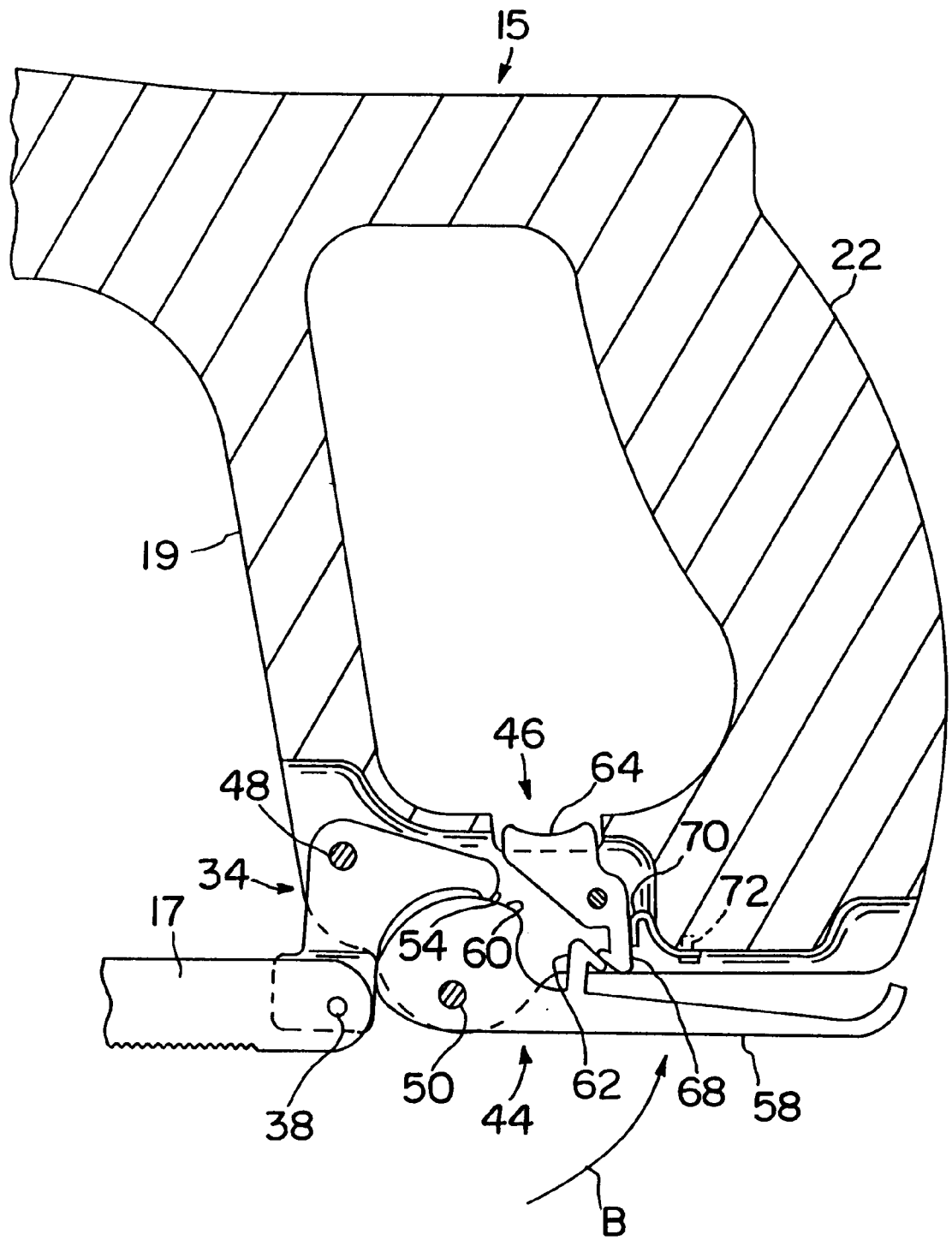

In FIG. 6B, blade 17 has been attached to blade pin 38. In addition, lever 58 has been rotated partially toward handle 22 as indicated by arrow B. This rotation of lever portion 58 causes cam follower 54 to engage a progressively larger diameter along cam surface 60. This causes pin carrier 34 to pivot such that blade pin 38 is moved axially away from blade pin 26 mounted on vertical member 18. The elliptically arcuate shape of cam surface 60 provides a generally constant tensioning force, e.g. twenty (20) pounds, to blade 17 throughout this movement.

Figure 6C:
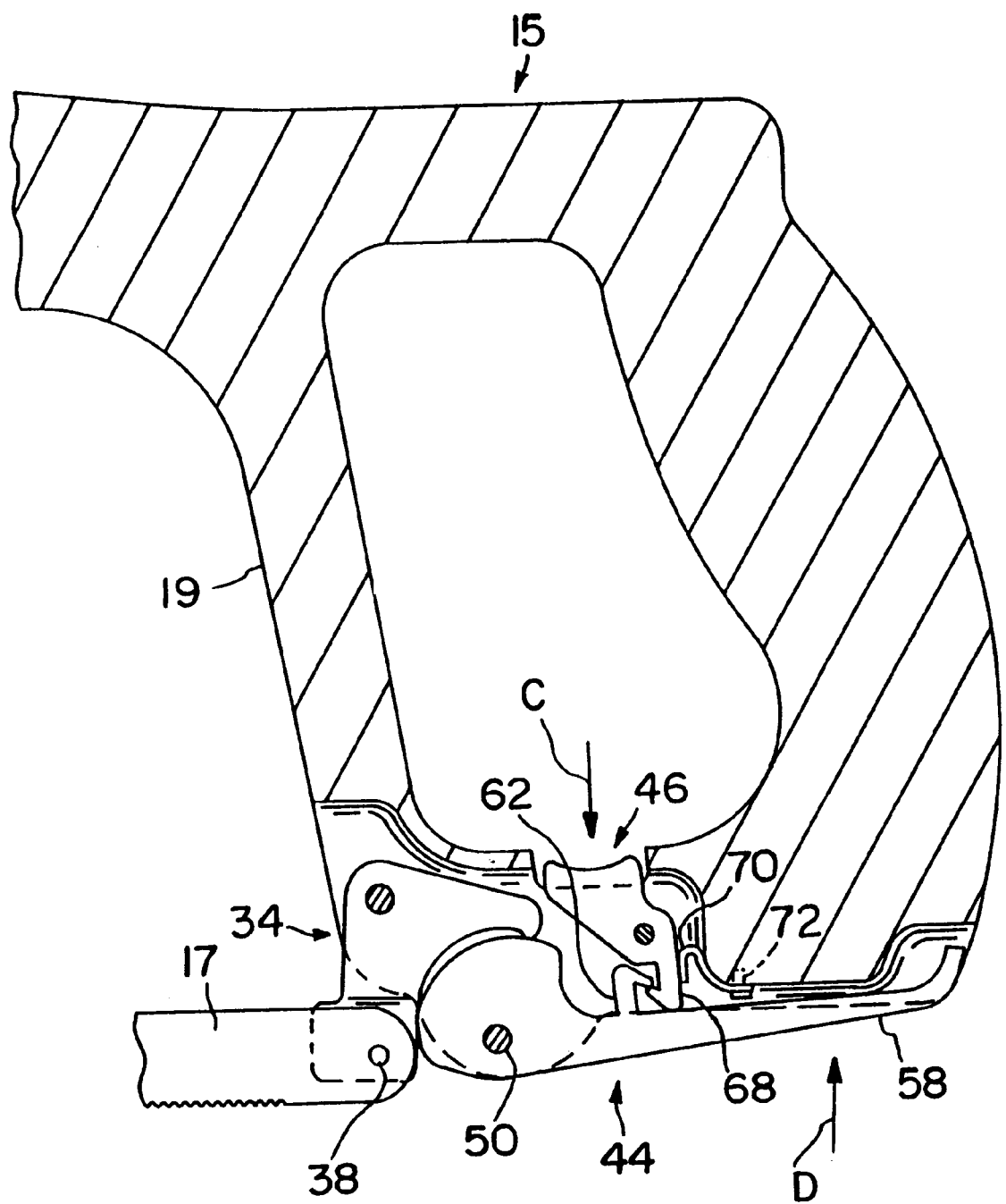

As shown in FIG. 6C, further movement of lever portion 58 toward handle 22 will cause blade pin 38 to move into a blade securement position. At this location, the tensioning mechanism will maintain a predetermined tension in blade 17. Engaging fingers 62 and 68 are interconnected to maintain actuator member 44, and thus pin carrier 34, in this position during use.

FIG. 6C illustrates another advantageous aspect of the illustrated construction. In particular, the mechanism is designed to inhibit release of blade 17 except when desired by the user. In this regard, the release mechanism requires the simultaneous occurrence of two events: release button 46 must be depressed (as shown by arrow C) at the same time that lever portion 58 is pulled up into handle 22 (as shown by arrow D). This will permit release button 46 to pivot from its engaging position to a release position. In this release position, engaging finger 68 disconnects from engaging finger 62. Lever portion 58 may then be pivoted down to the position shown in FIG. 6A for blade replacement.

Spring means may be provided to normally maintain release button 46 in its engaging position. In the illustrated embodiment, for example, a flat spring 70 engages the outer surface of release button 64 for this purpose. Flat spring 70 may be maintained in position utilizing a blind screw or rivet, such as rivet 72, extending into frame 12, as shown. It should be appreciated, however, that other suitable spring arrangements, such as a torsion spring, may also be utilized for this purpose.

The various components of the tensioning mechanism may be constructed of any suitable material. In some presently preferred embodiments, however, actuator member 44 and release button 46 may be made from extruded metal, such as extruded aluminum. Pin carrier 34 may be constructed, for example, of powdered metal.

While preferred embodiments of the invention have been shown and described, modifications and variations may be made thereto by those of ordinary skill in the art without departing from the spirit and scope of the present invention, which is more particularly set forth in the appended claims. In addition, it should be understood that aspects of the various embodiments may be interchanged both in whole or in part. Furthermore, those of ordinary skill in the art will appreciate the foregoing description is by way of example only, and is not intended to be limitative of the invention so further described in such appended claims.

What is claimed is:

1. A hacksaw for use with an elongated blade defining respective first and second mounting holes at opposite ends thereof, said hacksaw comprising:

a frame having a first leg and a second leg spaced apart for maintaining said elongated blade therebetween;

at least one first blade pin located on said first leg for receipt of said first mounting hole thereon;

a pin carrier connected to said second leg and including at least one second blade pin for receipt of said second mounting hole thereon, said pin carrier being pivotal such that said second blade pin is movable between a blade release position and a blade securement position;

an actuator member pivotally connected to said second leg and engaging said pin carrier to operatively move said second blade pin between said blade release position and said blade securement position; and wherein said actuator member defines a cam surface and said pin carrier includes a cam follower engaging said cam surface.

2. A hacksaw as set forth in claim 1, wherein said cam surface is an elliptically arcuate cam surface.

3. A hacksaw as set forth in claim 2, further comprising a releasable lock mechanism operative to maintain said second blade pin in said blade securement position.

4. A hacksaw as set forth in claim 1, wherein said pin carrier comprises a generally V-shaped member pivotable about a pivot point adjacent an apex thereof, said second blade pin and said cam follower each being located radially outward of said pivot point and separated from each other by a predetermined angular separation.

5. A hacksaw as set forth in claim 4, wherein said actuator member comprises an actuator portion defining said cam surface as an elliptically arcuate surface thereon, said actuator member further comprising a lever portion integrally extending from said actuator portion.

6. A hacksaw as set forth in claim 1, wherein said actuator member includes an elongated lever portion for providing mechanical advantage during movement of said second blade pin from said blade release position to said blade securement position.

7. A hacksaw as set forth in claim 6, further comprising a releasable lock mechanism including first and second engaging elements selectively interconnectable to maintain said second blade pin in said blade securement position.

8. A hacksaw as set forth in claim 7, further comprising a release actuator mounted to said frame and pivotal between a release position and an engaging position, and wherein said first and second engaging elements respectively comprise a first engaging finger extending from said lever portion of said actuator member and a second engaging finger extending from said release actuator.

9. A hacksaw as set forth in claim 8, further comprising spring means for urging said release actuator into said engaging position.

\* \* \* \* \*

UNITED STATES PATENT AND TRADEMARK OFFICE
CERTIFICATE OF CORRECTION

PATENT NO. : 6,070,330
DATED : June 6, 2000
INVENTOR(S) : Phelon et al.

It is certified that error appears in the above-identified patent and that said Letters Patent is hereby corrected as shown below:

Under "References Cited," please list the following:

U.S. PATENT DOCUMENTS
| | | |
|---|---|---|
| 5,471,752 | 12/1995 | Koetsch |
| 4,571,829 | 2/1986 | Withers, Jr. |
| 4,466,471 | 8/1984 | Thomson |
| 2,546,660 | 3/1951 | Wilcox |
| 2,034,625 | 3/1936 | Lorusso |
| 1,657,748 | 1/1928 | Hanning |

FOREIGN PATENT DOCUMENTS
| | | |
|---|---|---|
| 804,864 | 4/1951 | Germany |
| 493,972 | 10/1938 | Great Britain |

Signed and Sealed this

Third Day of July, 2001

*Attest:*

NICHOLAS P. GODICI
*Attesting Officer*     *Acting Director of the United States Patent and Trademark Office*